United States Patent

[11] 3,550,748

| [72] | Inventor | Werner Hauer |
| | | Sayre, Pa. |
| [21] | Appl. No. | 746,904 |
| [22] | Filed | July 23, 1968 |
| [45] | Patented | Dec. 29, 1970 |
| [73] | Assignee | International Telephone and Telegraph Corporation |
| | | Nutley, N.J. |
| | | a corporation of Delaware |

[54] CONVEYOR ARRANGEMENT
10 Claims, 5 Drawing Figs.

| [52] | U.S. Cl. | 198/38 |
| [51] | Int. Cl. | B65g 43/00 |
| [50] | Field of Search | 198/38, 218, 112, 111, 89; 214/11, 730 |

[56] References Cited
UNITED STATES PATENTS

| 2,536,412 | 1/1951 | Bamford | 198/111X |
| 3,173,533 | 3/1965 | Zuck | 198/38 |
| 3,334,725 | 8/1967 | Wardlaw et al. | 198/89 |

*Primary Examiner*—Evon C. Blunk
*Assistant Examiner*—Douglas D. Watts
*Attorneys*—C. Cornell Remsen, Jr., Walter J. Baum, Percy P. Lantzy, Philip M. Bolton, Charles L. Johnson, Jr. and Isidore Togut ABSTRACT: A conveyor arrangement employing trollies 11 for the conveyance of parcels, wherein each of the trollies have means for carrying the address of the position to which the parcel is to be conveyed, and the arrangement includes actuator means responsive to the address, whereby each of the trollies are activated to cause the parcels to be unloaded at the addressed position.

PATENTED DEC 29 1970 3,550,748
SHEET 1 OF 2
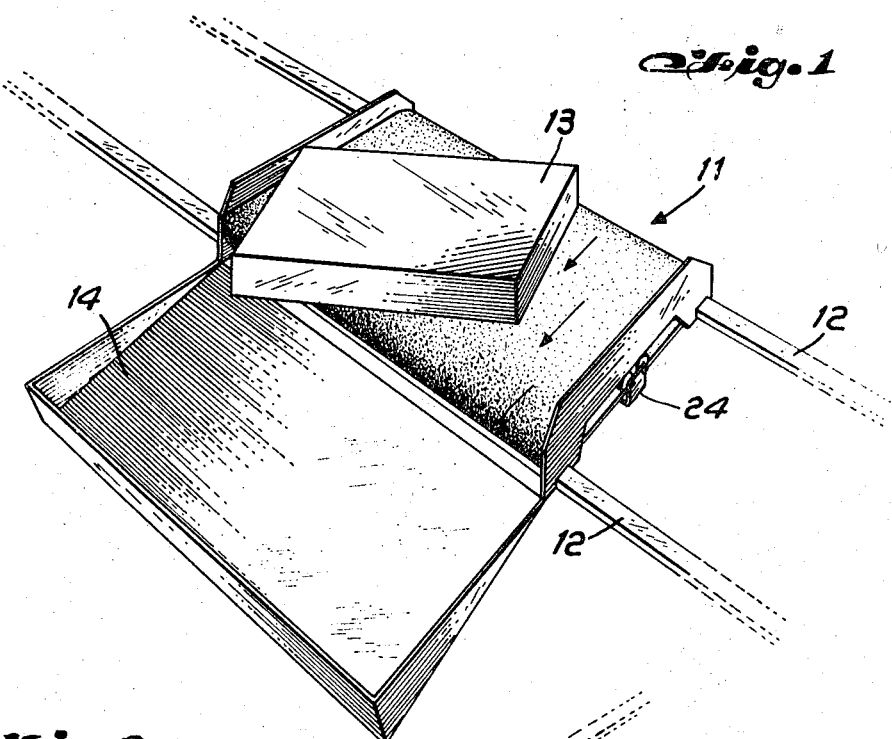
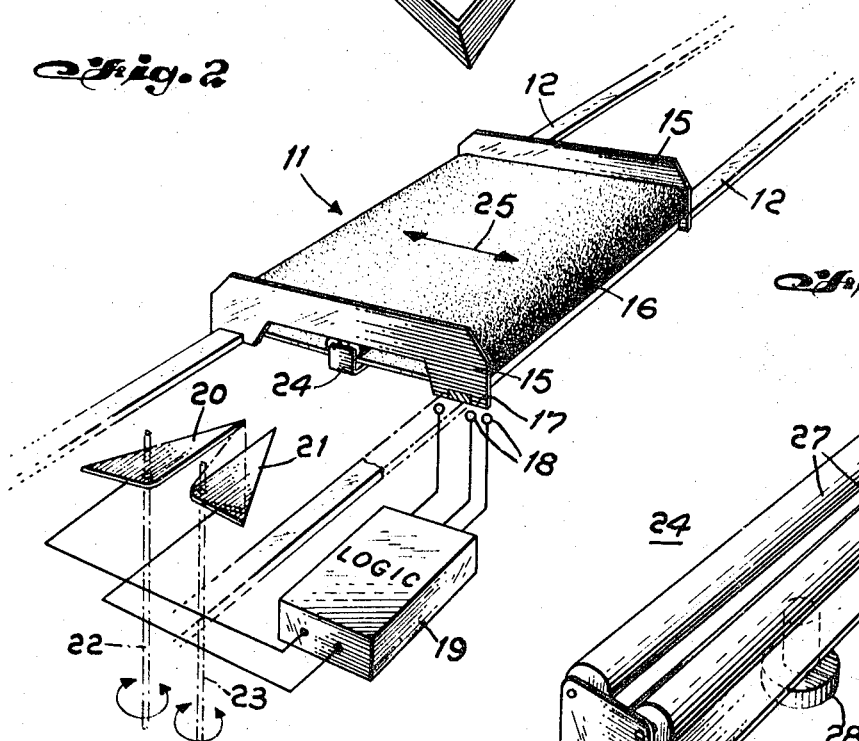
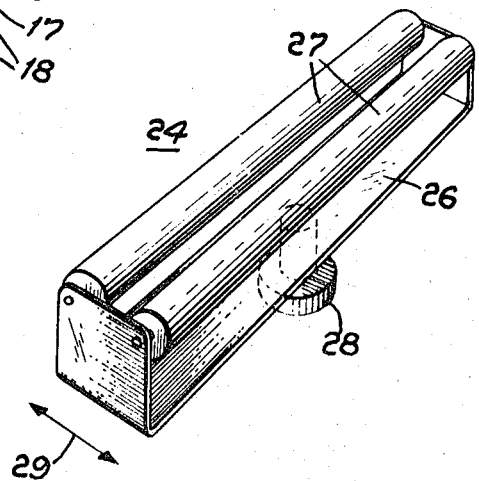
INVENTOR
WERNER HAUER
BY
ATTORNEY

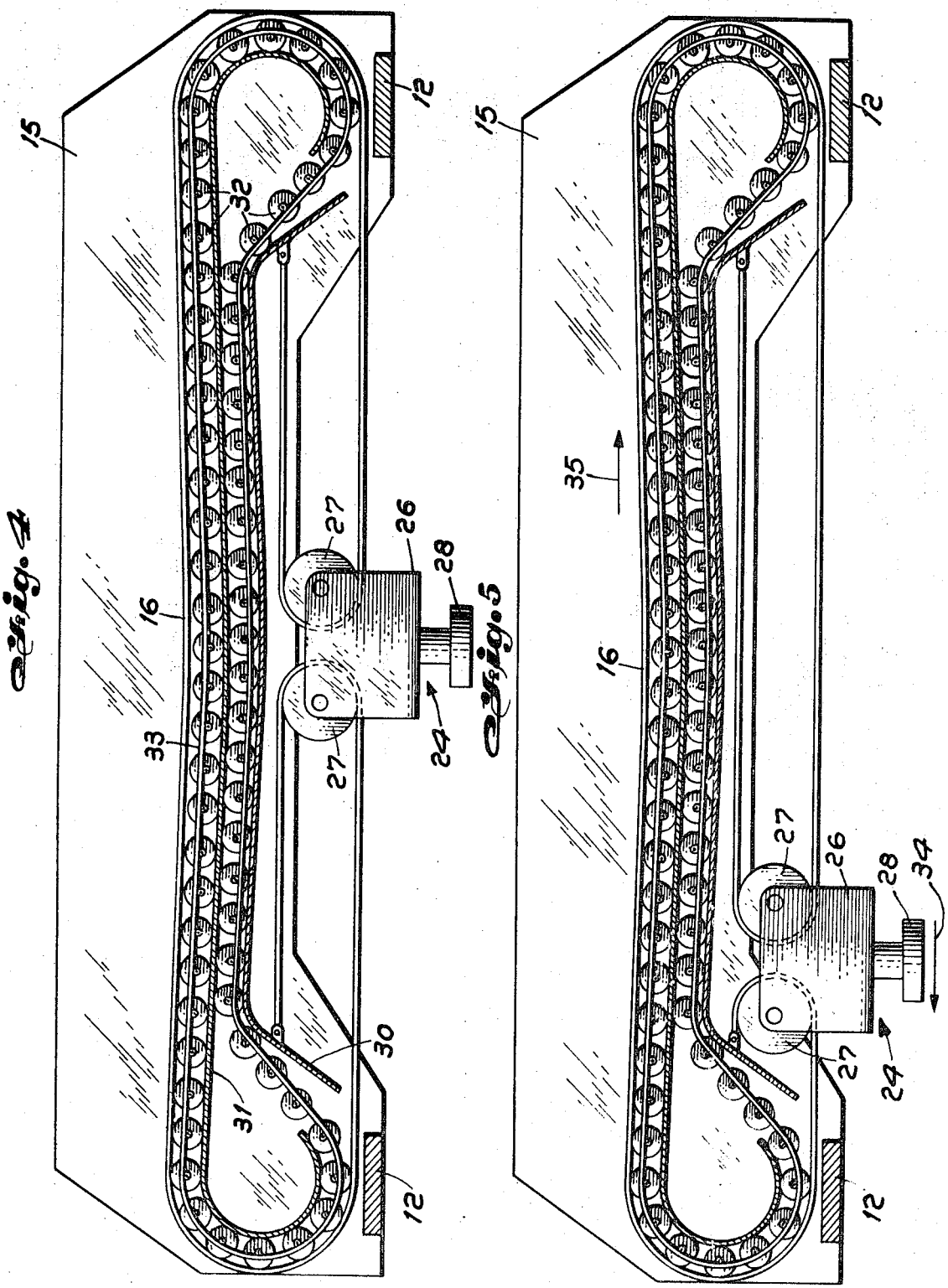

CONVEYOR ARRANGEMENT

BACKGROUND OF THE INVENTION

In general this invention is related to conveyor systems, and more particularly to conveyor systems employing trollies for the conveyance of parcels from one position to the position to which the parcels are to be delivered.

The trollies provided herein have means for carrying the address of the position to which the parcel is to be conveyed, and logic means for reading the address on each of the trollies. Actuator means are included which are responsive to the logic means to cause the trollies to unload the parcels at the desired addressed position. According to prior systems, delivery of a parcel to the desired position was accomplished by either a gravity operated delivery system, in which the bundles or parcels were directed by means of a shoot arrangement, or by a moving belt arrangement having single directional mobility. However, according to the arrangement provided herein, the trolley carried by the conveyor has X and Y directional mobility. The trolley is unloaded by a simplified electromechanical arrangement which is activated by a logic system which reads the identifying marks on the trolley.

SUMMARY OF THE INVENTION

It is therefore an object of this invention to provide a conveyor arrangement which includes a trolley adapted for conveying parcels from a loading station to an addressed unloading station.

It is another object of this invention to provide actuator means, which in response to the address located on said trolley, causes the parcel on said trolley to be unloaded at the addressed position.

A feature of this invention is that the trolley employs a slide belt which is adapted to move in a direction perpendicular to the direction of travel of said trolley.

According to the broader aspects of this invention, there is provided a conveyor employing trollies for the conveying of parcels and means for conveying said trollies from one position to another, each of said trollies being adapted for carrying the address of the position to which the parcel is to be conveyed and actuator means which, in response to logic means, cause a slide belt to be activated so that the parcels are unloaded at the proper addressed position.

BRIEF DESCRIPTION OF THE DRAWINGS

The above mentioned and other features and objects of this invention will become more apparent by reference to the following description taken in conjunction with the drawings, in which:

FIG. 1 illustrates a conveyor trolley according to the invention;

FIG. 2 illustrates the actuator means for the trolley according to the invention;

FIG. 3 illustrates the actuating follower means on the trolley;

FIG. 4 shows in a schematic form the features of the trolley in a neutral position; and FIG. 5 shows in a schematic form the features of the trolley in an actuated position.

BRIEF DESCRIPTION OF THE PREFERRED EMBODIMENT

Referring now to FIG. 1, there is shown a trolley 11 mounted on conveyor belts 12, the trolley 11 carrying a parcel 13 for unloading into a bin or position 14. The trolley 11 is brought to this position and unloaded by means more fully described by reference to FIG. 2.

In FIG. 2, the trolley 11 is shown to comprise end frames 15 and a slide belt 16. The forward end frame 15 has address marks 17 which are sensed by sensing means 18 and fed to the logic device 19.

The actuators 20 and 21 are controlled by the logic device 19 and are movable about an axis 22, 23 in both a clockwise and counterwise direction. The actuators 20, 21, which may be electromechanical actuators, act upon actuating follower means 24 which causes the slide belt 16 to move in either direction as indicated by arrow 25.

If logic device 19 senses that a particular arrangement of marks 17 indicate that a parcel is to be unloaded at a certain position towards the left of trolley, then the actuator means 21 responds by moving to the position shown in dotted lines, this causes the actuating follower means 27 to move toward the right and thereby unload any parcel on the left side of the trolley. If no parcel is to be unloaded at this particular station then the actuators 20, 21 remain in the unactivated position, and the actuating follower means is allowed to pass between the actuators so that the package remains on the trolley and is removed at the proper addressed location as indicated by identifying marks 17 on the end frame. By proper utilization of the actuators 20, 21 and actuating follower means 24, the parcel on trolley 11 can be deposited at a desired position from either the left or right side of the trolley, thereby providing motion of the parcel along the conveyor belt 12 and unloading in a direction perpendicular to the direction of travel.

Referring now to FIG. 3, a pictorial view of the actuating follower means 24 is shown comprising, a U-shaped bracket 26 in which there is mounted actuating drive pulleys 27, and a cylindrical follower 28 which is mounted at a lower portion of the bracket for engaging actuating means 20, 21. The actuating follower means 24 is movable in a direction indicated by arrow 29 and its coaction with slide belt 16 will be more fully understood by referring to FIGS. 4 and 5 which illustrates the trolley in a neutral and in an actuated position.

In FIG. 4, the actuating follower means 24 is arranged so that belt 16 is threaded around each drive pulley 27 and attaches, at each end, to an inner camming surface 30. In addition, there is arranged an outer camming surface 31 around which, together with inner camming surface, ride a continuous loop of needle rollers 32. Only a few needle rollers are shown, but the chain of needle rollers are connected by links 33. Thereby, as shown in FIG. 5, when actuating follower means 24 is caused to move in the direction of arrow 34 by virtue of actuating means 20, the slide belt 16 will move in the direction indicated by arrow 35, and cause any parcel on slide 16 to move in the direction of arrow 35. This movement is due to the drive and belt system being such that the stroke of drive pulleys is doubled, since it is considered as an inverted block and tackle arrangement. A left stroke of half a length moves the belt a full length and unloads all parcels placed on the trolley.

This arrangement enables a conveyor system moving in a given direction to discharge the parcels in a direction perpendicular to the direction of travel of the trolley.

Although I have described the principles of my invention in connection with specific apparatus, it is to be clearly understood that this description is made by way of example and not as a limitation to the scope of the invention as set forth in the objects thereof and in the accompanying claims.

I claim:

1. A conveyor arrangement comprising:
   a trolley having a slide belt adapted for conveying parcels;
   means for conveying said trolley from one position to another;
   address means on said trolley for carrying the address of the position to which a parcel is to be conveyed;
   logic means for reading said address;
   actuating means mounted to move about an axis perpendicular to the conveying direction and responsive to said logic means to cause the unloading of said parcel at the addressed position; and
   actuating follower means on said trolley which is activated by said actuating means to cause said belt to move in a direction perpendicular to the direction of travel of said trolley.

2. A conveyor according to claim 1, wherein said actuating means in response to said logic means is caused to pivot and move said actuating follower means in a direction opposite to the direction of unloading.

3. A conveyor according to claim 2 wherein said actuating means comprises:
 a U-shaped bracket;
 a pair of drive pulleys parallel mounted in said bracket;
 and a cylindrical follower extending from the lowest portion of said U-shaped bracket and adapted for engaging said actuator means, whereby said slide belt is caused to move in a direction perpendicular to the direction of travel of said trolley.

4. A conveyor according to claim 3 wherein said trolley further includes:
 an inner camming surface;
 an outer camming surface; and
 a continuous loop of needle rollers arranged on said inner and outer camming surfaces, such that said slide belt is connected through said drive pulleys to each end of the inner camming surface, so as to enclose said continuous loop of needle rollers around said outer cam surface and said inner camming surface.

5. A conveyor according to claim 1, wherein said actuator means is an electromechanical actuator and said follower means includes a follower portion which engages said electromechanical actuating means, said follower portion is caused to move in a direction opposite to the unloading direction of said parcel.

6. A conveyor according to claim 5 where:
 said actuating follower means include a pair of parallel mounted drive pulleys around which is looped said slide belt;
 an inner camming surface terminating the end of said slide belt, such that said slide belt is formed in a continuous loop;
 an outer camming surface which together with said inner camming surface forms a path upon which a continuous loop of needle rollers are mounted; and
 said actuating follower means movement in one or another direction will cause opposite movement of said slide belt.

7. A conveyor arrangement according to claim 6, wherein the end frame of said trolley includes indicating marks for indicating the address of a position to which the parcel is to be conveyed, said indicating mark being detectable by detector means associated with said logic means.

8. A conveyor arrangement according to claim 7, wherein said actuator means is an electromechanical arrangement pivotable mounted about an axis perpendicular to the direction of travel of said trolley, whereby displacement of said electromechanical actuator means causes displacement, during passage of said trolley, of said drive pulley arrangement, and the slide belt is caused to move in a direction opposite to said drive pulleys so as to cause the unloading of said parcel.

9. A conveyor arrangement according to claim 8, wherein the means for conveying said trolley from one position to another is a conveyor belt track.

10. A conveyor according to claim 1 wherein said trolley further includes:
 a continuous loop of needle rollers;
 an outer camming surface and an inner camming surface arranged such that said continuous loop of needle rollers ride on the outer and inner camming surface;
 said actuator follower means including a pair of parallel mounted drive pulleys around which is looped said slide belt, such that said slide belt has each end attached to one end of said inner camming surface; and
 said drive pulleys and belt connection is such that a stroke of the drive pulley is doubled by the slide belt, and half a length movement of the drive pulley is equivalent to a full length movement of the slide belt which is sufficient to unload any parcel placed on the trolley.